April 5, 1960 R. L. DALTON 2,931,281
SLIDE LOCK FOR PHOTOGRAPHIC CAMERAS
Filed April 14, 1958

INVENTOR.
ROBERT L. DALTON
BY
ATTORNEY

2,931,281

SLIDE LOCK FOR PHOTOGRAPHIC CAMERAS

Robert L. Dalton, Pittsford, N.Y., assignor to Graflex, Inc., Rochester, N.Y., a corporation of Delaware Application April 14, 1958, Serial No. 728,419

4 Claims. (Cl. 95—11)

The present invention relates to photographic cameras, and more particularly to slide locks for clamping sensitized film holders to the back of a camera.

One object of the present invention is to provide a slide lock which will lock a film holder tighter and more securely to a camera than conventional slide locks.

Another object of the invention is to provide a slide lock which will accommodate itself to variations in thickness of the flanges of film holders, and will clamp the film holder to the back of a camera securely regardless of such variations in thickness.

Still another object of the invention is to provide a slide lock which will operate much easier and be simpler in construction than conventional slide locks, and which will not require any special construction of the camera back.

Other objects of the invention will be apparent hereinafter from the specification and from the recital of the appended claims.

In the drawing:

Fig. 1 is a rear elevation showing the back of a camera provided with a pair of slide locks made according to one embodiment of this invention for securing a film holder to the camera back, the slide locks being shown in released position;

Fig. 2 is a part end view, part transverse section, showing a film holder secured to the back of the camera by the slide locks, and showing further the construction of the slide locks and cooperating parts of the back of the camera, the slide lock at the left being shown in section in the plane of the pin on which it rides, and the slide lock at the right being shown in section in a plane adjacent the near end of this slide lock;

Figure 2:
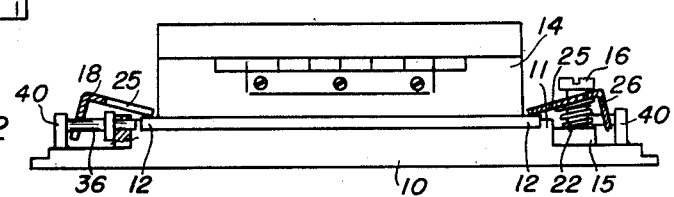

Referring now to the drawing by numerals of reference, 10 denotes the back of a camera. The back is formed at its rear with parallel longitudinally disposed side walls 11 that bound a recess or well adapted to receive a film pack adapter, cut-film magazine, or other sensitized film holder 14. Such film holders are conventionally provided with side flanges such as shown at 12 in Fig. 2.

The rear face of the camera back 10 is formed at both sides of the recess for the film holder with a pair of longitudinally-spaced bosses 15. In each of these bosses there is mounted a headed screw 16. Each slide lock 18 is mounted to slide on one pair of these screws. Each screw has a shank portion that passes through a cam slot 20 in the slide lock; and each slide lock is normally held against the heads of its screws by a coil spring 22 that surrounds the shank portion of the screw and that is interposed between the associated boss 15 and a washer 24 that is adapted to seat against the underface of the slide lock. The cam slots 20 are so shaped as to move each slide lock inwardly over the associated flange 12 of the film holder as the slide lock is moved longitudinally from left to right in Fig. 1.

Figure 3:
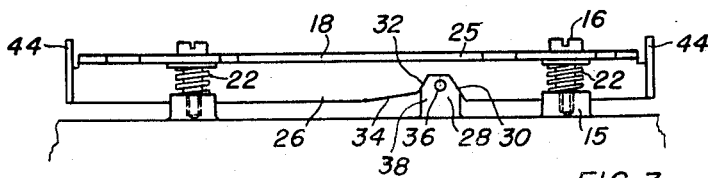
Fig. 3 is a fragmentary section on the line 3—3 of Fig. 1 looking in the direction of the arrows.
Figure 5:
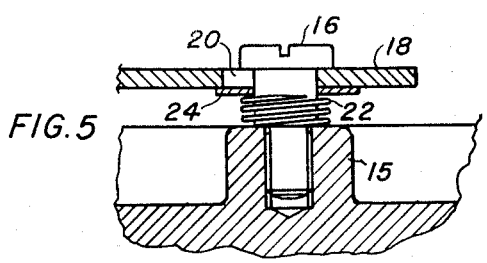
Fig. 5 is a section on a further enlarged scale taken on the line 5—5 of Fig. 1 looking in the direction of the arrows.

Each slide lock has a pair of longitudinally-spaced retaining or clamping portions 25 and a side flange or web portion 26 that is offset laterally from the portions 25. Each side flange or web extends at right angles to the retaining or clamping portions 25 and has a recess 28 intermediate its ends. The recess is bounded by steeply inclined wall portions 30 and 32; and each side flange or web has a slightly upwardly inclined bottom face 34 joining the wall portion 32 of the recess. Pins 36 are secured, respectively, at opposite ends in aligned bosses 38 and 40 formed on the camera back. Each pin is disposed in one of the recesses 28. When a slide lock is moved from left to right in Fig. 3, the associated pin 36 will ride on the inclined portion 34 of the flange 26 of the slide lock. Since the web portion 26 is offset laterally from the clamping portion 25 of the slide lock and from the longitudinal center line of the associated screws 16, when the web portion 34 rides on the associated pin 26, the slide lock will be tilted downwardly, as though about a longitudinal axis, against the resistance of springs 22 to cause the slide lock to clamp the flanges 12 of the film holder 14 firmly.

The slide locks are formed at opposite ends with upturned tabs 44, whereby they may be manipulated to move the slide locks longitudinally.

Figure 1:
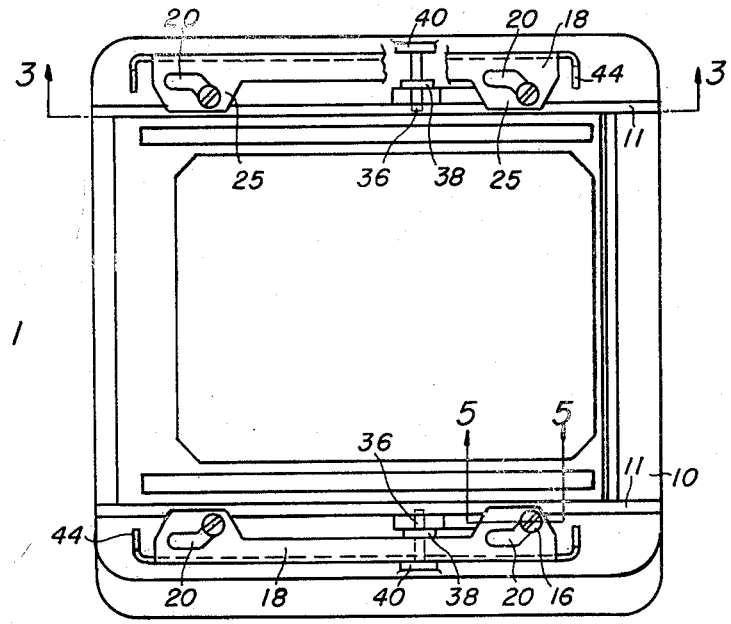
Figure 4:
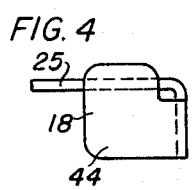
Fig. 4 is an end elevation of one of the slide locks on a somewhat enlarged scale.

When a slide lock is moved to the right from the position shown in Fig. 1, therefore, the cam slots 20 first cause the clamping portions 25 of the slide lock to move inwardly over the film holder. Then, as the inclined surface 34 of the flange 26 engages the associated pin 36, the slide lock will be tipped down onto the adjacent flange 12 of the film holder 14, thereby locking the film holder securely to the back of the camera. Similarly the other slide lock can be moved to engage the opposite flange of the holder 14; and between them the slide locks rigidly clamp the film holder to the camera.

The slide locks of this invention allow for considerable variations in height of the flanges of the film holders, and operate much easier than conventional slide locks.

While the invention has been described in connection with a particular embodiment thereof, it is capable of further modification, and this application has been intended to cover any variations, uses, or adaptations of the invention, following, in general, the principles of the invention and including such departures from the present disclosure as come within known or customary practice in the art to which the invention pertains, and as may be applied to the essential features hereinbefore set forth, and as fall within the scope of the invention or the limits of the appended claims.

Having thus described my invention, what I claim is:

1. A photographic camera having a seat for receiving a removable object, and means for clamping said object on said seat, comprising a slide lock mounted on the camera at one side of said seat for longitudinal movement, said slide lock having a clamping portion which has a cam slot therein, a pin secured in said camera engaging in said cam slot to cooperate therewith to move said slide lock inwardly over said seat when said slide lock is moved longitudinally in one direction, and means fixedly mounted on said camera and positioned to engage said slide lock during said longitudinal movement to tilt said slide lock downwardly about a longitudinal axis during said longitudinal movement thereby to clamp the object on said seat.

2. A photographic camera having a seat for receiving a removable object, and means for clamping said object on said seat, comprising a slide lock mounted on the camera at one side of said seat for longitudinal movement, said slide lock having a clamping portion which has a cam slot therein, and said slide lock having a web portion at one side extending at an angle to said clamping portion and offset laterally therefrom, a pin secured in said camera and engaging in said cam slot and cooperating therewith, said cam slot being shaped to move said slide lock inwardly over said seat when said slide lock is moved longitudinally in one direction, and means engaging said web portion as said slide lock is moved in said one direction to tilt said slide lock downwardly during said movement to clamp the object on said seat.

3. A photographic camera having a seat for receiving a removable object, and means for clamping said object on said seat comprising a slide lock mounted on the camera at one side of said seat for longitudinal movement, said slide lock having a clamping portion which has a cam slot therein, and said slide lock having a web portion at one side extending at right angles to said clamping portion and offset laterally therefrom, a pin secured in said camera and engaging in said cam slot and cooperating therewith to move said slide lock inwardly over said seat when said slide lock is moved longitudinally in one direction, said web portion having an inclined surface, and a follower positioned to ride on said surface to tilt said slide lock downwardly during said movement to clamp the object on said seat.

4. A photographic camera having a seat for receiving a removable object, and means for clamping said object on said seat comprising a slide lock mounted on the camera at one side of said seat for longitudinal movement, said slide lock having two longitudinally spaced clamping portions, each of which has a cam slot therein, the two cam slots being identical, said slide lock having a longitudinally extending web portion at one side thereof extending at right angles to said clamping portions and offset laterally therefrom, a pair of screws threaded into said camera and engaging, respectively, in the two cam slots to cooperate therewith, a spring surrounding each screw and interposed between the associated clamping portion and the camera, said web portion having a recess therein disposed longitudinally between said two cam slots, and said web portion having an inclined undersurface joining said recess at one side thereof, a pin secured in said camera to extend into said recess and at right angles to said web portion and to ride on said inclined underface when said slide lock is moved longitudinally in one direction, said cam slots being shaped to move said slide lock laterally over the object before said pin engages said underface upon longitudinal movement of said slide lock in said one direction, and said inclined underface serving to tilt said clamping portions downwardly to grip the object when said inclined under face rides on said pin.

References Cited in the file of this patent

UNITED STATES PATENTS 2,201,511  Williams _____ May 21, 1940